United States Patent [19]

Müller

[11] 4,313,407
[45] Feb. 2, 1982

[54] INJECTION NOZZLE FOR AIR-COMPRESSING DIRECT INJECTION INTERNAL COMBUSTION ENGINES

[75] Inventor: Eckart Müller, Nürnberg, Fed. Rep. of Germany

[73] Assignee: Maschinenfabrik Augsburg-Nürnberg Aktiengesellschaft, Nürnberg, Fed. Rep. of Germany

[21] Appl. No.: 110,495

[22] Filed: Jan. 8, 1980

Related U.S. Application Data

[63] Continuation of Ser. No. 864,604, Dec. 27, 1977, abandoned.

[30] Foreign Application Priority Data

Dec. 24, 1976 [DE] Fed. Rep. of Germany ....... 2658783

[51] Int. Cl.$^3$ .............................................. F02B 3/00
[52] U.S. Cl. .................... 123/276; 123/279; 123/262
[58] Field of Search ............ 123/32 A, 279, 262, 123/276

[56] References Cited

U.S. PATENT DOCUMENTS 1,634,132  6/1927  Banner ................................ 123/323
3,085,557  4/1963  Meurer ............................ 123/32 A

FOREIGN PATENT DOCUMENTS 485442  5/1938  United Kingdom ................ 123/296

Primary Examiner—Ronald B. Cox
Attorney, Agent, or Firm—Becker & Becker, Inc.

[57] ABSTRACT

An injection nozzle for an air-compressing direct injection internal combustion engine which has a combustion chamber in the shape of a body of revolution in the piston head or in the cylinder head, and in which a rotary air movement occurs in the combustion chamber about its longitudinal axis while a portion of the injected liquid fuel is being deposited as a thin film on the wall of the combustion chamber. The injection nozzle has a slot-shaped discharge opening which is so located with regard to the combustion chamber that the fuel spray emitted through this discharge opening, when viewed over its entire width, at nearly the same time impinges upon the combustion chamber wall and spreads thereon in the form of a wide surface film, the cross section of the discharge opening corresponding to the cross section of a one-bore injection nozzle customarily employed for the mixture formation and combustion method under the same conditions.

2 Claims, 4 Drawing Figures

INJECTION NOZZLE FOR AIR-COMPRESSING DIRECT INJECTION INTERNAL COMBUSTION ENGINES

This is a continuation of application Ser. No. 864,604 Müller filed Dec. 27, 1977, now abandoned.

The present invention relates to an air-compressing direct-injection internal combustion engine having a combustion chamber in the shape of a body of revolution in the piston crown or cylinder head with a rotary air motion prevailing in said combustion chamber about its longitudinal axis and with a proportion of the liquid fuel injected being deposited as a thin film on the combustion chamber wall where it is evaporated, mixed with the rotating air and burnt.

Internal combustion engines using the above described mixture formation and combustion system are well known and disclosed, e.g. in German Pat. No. 865,633. Although this system has proved to give a very good performance and has been accepted by industry, it has been beset by a drawback inasmuch as mixture formation in the lower load range, during idling and, in particular during starting, fails to take place quickly enough because of the low temperature of the combustion chamber wall. As a result thereof, incomplete combustion and poorer exhaust gas quality are encountered.

A number of steps have been proposed to overcome this drawback. Thus, for instance, the German Pat. No. 1,526,324 suggests to reduce wall deposition of the fuel in the operating ranges referred to as a function of the combustion chamber wall temperature or the exhaust gas temperature by varying the position of the fuel sprays and/or the fineness of atomization of fuel in order to achieve a greater degree of direct fuel/air mixing. Such an arrangement, however, is rather complicated and, consequently, expensive and liable to disorders.

Furthermore, the German Pat. No. 1,252,168 proposed the use of a rotary nozzle in which the spray passage in the front part of the pintle is tangential and the pintle is rotatable by an adjusting device in conformity with the engine load.

This system, too, is complicated and susceptible to trouble. To mention just one more example, German Pat. No. 491,153 discloses an arrangement according to which the injection nozzle is formed with a central hole for injection when the engine idles and a plurality of annularly arranged further openings through which additional fuel is injected when operating under load. The additional openings are supplied with fuel only when a valve is opened due to the rise in pressure. Aside from the fact that this nozzle, too, is not simple in its design, it would also be unsuitable for wall deposition of the fuel.

It is, therefore, an object of the present invention to provide an injection nozzle which, while being simple in construction, will assure a good mixture formation and combustion and thereby a better exhaust gas quality, also in the lower load range, during idling and during starting.

This object and other objects and advantages of the invention will appear more clearly from the following description in connection with the accompanying drawings, in which.

The injection nozzle according to the invention is characterized primarily in that the injection nozzle has a slot-shaped discharge opening for fuel injection, and in that the position of this discharge opening is so selected that the emitted fuel spray impinges on the combustion chamber wall substantially at the same time across its full width and spreads as an extensive film on the wall, while the cross-sectional flow area of the discharge opening is so proportioned as to correspond to the cross-sectional area of a single-hole nozzle such as is usually employed for the mixture formation and combustion system described.

The above outlined objective is thus completely attained at the lowest cost and without the need for any moving parts which are susceptible to disorders. The slot-shaped discharge opening produces a fuel spray having a large surface so that, in particular, in the lower load range and at no load when the rate of injection is very low and the single-hole nozzle will produce very large droplets, fuel preparation takes place at a faster rate due to the direct fuel/air mixing. This process is substantially assisted by the fact that the narrow discharge slot permits only small fuel particles to form which are easy to prepare. As the load increases, the rate of injection will increase. In the case of the small fuel particles which are produced by the slot nozzle this will lead to a smaller increase in particle disintegration in the air for combustion than with the large fuel particles from the single-hole nozzle so that the slot nozzle also enables pronounced wall deposition of the fuel to be obtained in the upper load range.

Figure 1:
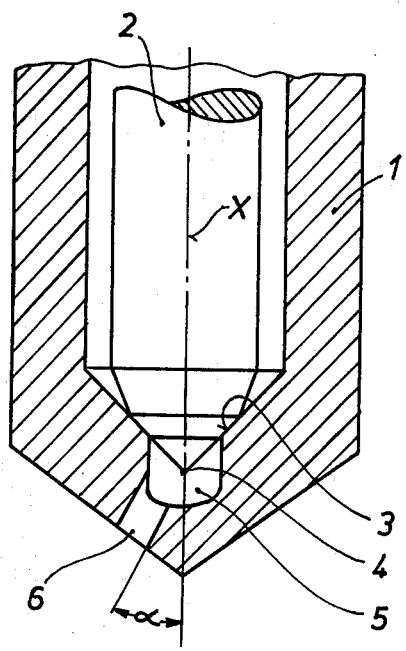
FIG. 1 is a longitudinal section through the lower part of an injection nozzle according to the invention.

Referring now to the drawing in detail, in FIG. 1 the injection nozzle body 1 has a nozzle needle 2 guided therein. A spring (not shown) continuously urges the needle 2 into its sealing position in which it sealingly engages the seat 3. Below the seat 3 and, more specifically, below the nozzle needle tip 4 there is a hollow space 5 formed by a concave interior surface in the injection nozzle body 1 from which a slot-shaped discharge opening 6 having a constant width throughout and inclined at an angle $\alpha$ relative to the longitudinal axis x of the injection nozzle extends to the outside of the nozzle body 1 for fuel injection into the combustion chamber. The nozzle body 1 has a convex exterior surface at one end thereof through which the discharge opening extends at an oblique angle with reject to the longitudinal axis of the nozzle body. This angle $\alpha$ depends on the installation of the nozzle and the desired injecting position and normally may vary from 1° to 85°.

Figure 3:
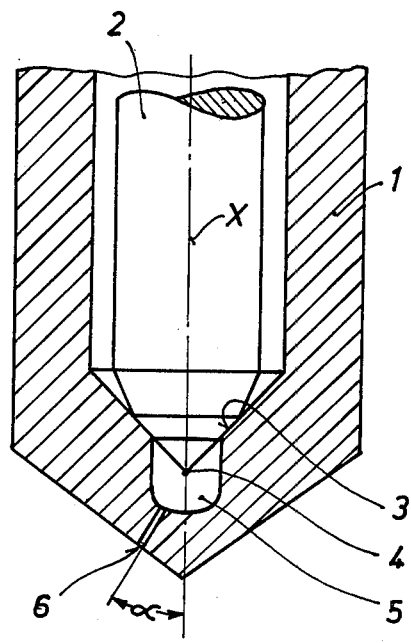
FIG. 3 is a longitudinal section through a modified lower part of an injection nozzle according to the invention in which the discharge opening differs from that of FIG. 1 in location and design.
Figure 2:
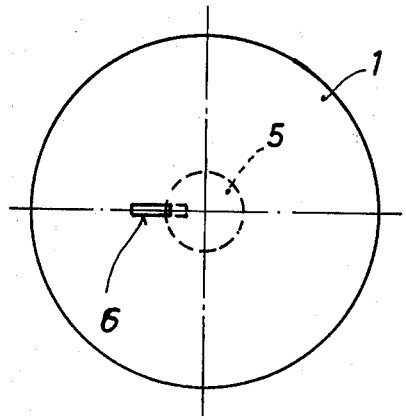
FIG. 2 is a bottom view of the injection nozzle according to FIG. 1.
Figure 4:
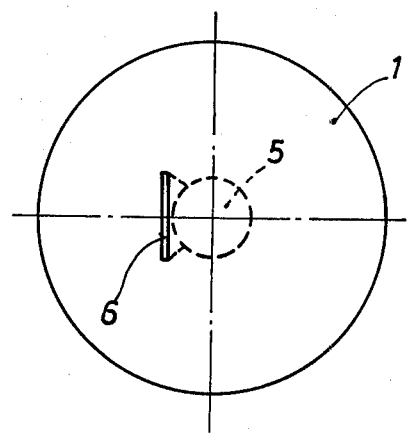
FIG. 4 is a bottom view of the injection nozzle according to FIG. 3.

FIG. 2 shows that the discharge opening 6 extends from the longitudinal axis x of the injection nozzle radially towards the outside. This arrangement is by no means mandatory and depends completely on the shape of the combustion chamber and the orientation of the injection nozzle. Thus, the discharge opening might perfectly well be disposed obliquely or even turned through 90° such as is shown by way of example in FIGS. 3 and 4. Finally, it can be seen from these figures that the discharge opening 6 may be conically increased in its width from the hollow space 5 towards the outer surface of the nozzle body 1. Such a configuration, too, depends on the shape of the combustion chamber and the width of the desired fuel film.

It is, of course, to be understood that the present invention is by no means limited to the particular showing in the drawings but also encompasses any modifications within the scope of the appended claims.

What I claim is:

1. A fuel injection nozzle for use with an internal combustion engine wherein the engine includes a reciprocating piston having a cavity which forms a combustion chamber in the top surface of the piston which cavity has a wall in the shape of a surface of revolution wherein means are provided for causing air to swirl in the cavity as the piston reciprocates, the nozzle comprising:

a hollow nozzle body with a nozzle needle positioned therein along the longitudinal axis of the body, said hollow nozzle body including a convex exterior surface at one end thereof, which exterior surface is a surface of revolution about the longitudinal nozzle axis; said nozzle body further including a concave, interior surface which is also a surface of revolution about the nozzle axis and is closed at one end by the nozzle needle when the nozzle needle is sealed to form a hollow space, and a discharge opening extending from the concave inner surface through the convex exterior surface, said discharge opening having a longitudinal axis which extends obliquely with respect to the longitudinal axis of the hollow nozzle body;

said discharge opening being elongated in cross section taken normal with respect to the longitudinal axis of the discharge opening wherein the transverse length of the opening is greater than the transverse width wherein fuel ejected through the opening forms a stream having a leading edge which conforms to the surface of the combustion chamber wall;

whereby fuel pushed through the discharge opening by the nozzle needle at high engine leads emerges in a wide flat spray which impinges upon the wall of the combustion chamber along a line which spreads over the wall of the combustion chamber as a film due to swirl of air in the combustion chamber, and whereby fuel pushed through the discharge opening by the nozzle needle at low engine loads substantially mixes in the swirl of air before impinging on the wall of the combustion chamber.

2. The fuel injector nozzle of claim 1 wherein the discharge opening diverges as it progresses from the concave interior surface to the convex exterior surface.

* * * * *